UNITED STATES PATENT OFFICE.

L. R. ROCKWOOD, OF WORCESTER, MASSACHUSETTS, ASSIGNOR TO J. L. CLOUGH, OF SAME PLACE.

IMPROVEMENT IN BLACKING.

Specification forming part of Letters Patent No. 23,065, dated February 22, 1859.

*To all whom it may concern:*

Be it known that I, LEVI R. ROCKWOOD, of the city and county of Worcester and State of Massachusetts, have invented an improved composition for blacking and polishing the edges of the soles of boots and shoes, and for similar purposes, styled "Edge-Blacking;" and I do hereby declare the following to be a full, clear, and exact description of the components and process of making said edge-blacking.

The object of my invention is to produce a blacking for the use of boot and shoe manufacturers, harness-makers, and others which shall give a permanent black to the leather, particularly when applied to its edges, and at the same time give a good polish by the application of friction in the usual way; and to this end the nature of my invention consists in compounding the following articles as described, and though some little variation may be made, yet it will be found necessary to follow the directions pretty closely to make the best quality of blacking.

The proportions herein stated are for making forty gallons, and the materials to be of good commercial quality.

First dissolve one and a half pound of the best flake gum-tragacanth in four and a half gallons of soft water. Strain and add eight ounces of sulphuric acid of commercial strength. Stir frequently for twenty-four hours. Then add one-half a gallon of good olive-oil, thoroughly incorporate, and stir frequently for forty-eight hours, after which this, which I call the "oil solution," is ready for use. Next, to twenty-five gallons of soft water heated to near the boiling-point add ten pounds of the best extract of logwood. When well dissolved add ten pounds of gum-arabic dissolved in five gallons of hot water. Cool the mixture to about 175° Fahrenheit and add forty pounds of sulphate of iron, after which dissolve and cool the whole to about 90° and add the aforesaid oil solution. Mix well and add twenty-eight ounces of sulphuric acid. Stir well and add the following, which is to be prepared at the same time as the above, or so as to be ready at this time to be added—to wit: forty ounces of bichromate of potash dissolved in hot water, then cooled to 125°, or thereabout, and four ounces of sulphuric acid added. After adding this to the former, add to the whole water enough to make forty-one gallons, (the one gallon to allow for evaporation in cooling,) and if not made in a wooden vessel should now be put into one and stirred till cool, then allowed to stand thirty days, after which it may be bottled for use. Any iron or non-metallic vessel may be used.

What I claim as new, and desire to secure by Letters Patent, is—

Edge-blacking when composed of the above-mentioned materials, in the proportions and manner substantially as set forth and described.

L. R. ROCKWOOD.

Witnesses:
SAML. A. ARNOLD,
JAS. G. ARNOLD.